(12) United States Patent  (10) Patent No.: US 7,034,464 B1
Izadian et al.  (45) Date of Patent: Apr. 25, 2006

(54) GENERATING LIGHT FROM ELECTROMAGNETIC ENERGY

(75) Inventors: Jamal S. Izadian, San Jose, CA (US);
Larry DeClue, Saratoga, CA (US);
David Fealkoff, Thousand Oaks, CA (US)

(73) Assignee: Sigma Designs, Inc., Milpitas, CA (US)

( * ) Notice: Subject to any disclaimer, the term of this patent is extended or adjusted under 35 U.S.C. 154(b) by 415 days.

(21) Appl. No.: 10/226,644

(22) Filed: Aug. 23, 2002

Related U.S. Application Data

(60) Provisional application No. 60/337,057, filed on Nov. 6, 2001.

(51) Int. Cl.
*H01J 7/46* (2006.01)

(52) U.S. Cl. .................... 315/39; 315/39.51; 315/248; 313/484

(58) Field of Classification Search ................. 315/39, 315/39.51, 248; 313/484
See application file for complete search history.

(56) References Cited

U.S. PATENT DOCUMENTS

| 4,562,305 | A |   | 12/1985 | Gaffney et al. |
| 5,998,934 | A | * | 12/1999 | Mimasu et al. ............ 315/118 |
| 6,412,024 | B1 |   | 6/2002 | Hsu et al. |
| 6,421,096 | B1 |   | 7/2002 | Nguyen |
| 6,427,203 | B1 |   | 7/2002 | Le Cornec |
| 6,448,825 | B1 |   | 9/2002 | Le Cornec et al. |
| 6,815,896 | B1 | * | 11/2004 | Kang .......................... 315/39 |

FOREIGN PATENT DOCUMENTS

JP          05-304638          11/1993

* cited by examiner

*Primary Examiner*—David Vu
(74) *Attorney, Agent, or Firm*—Sawyer Law Group LLP

(57) ABSTRACT

A device that converts non-visible electromagnetic energy into light. The device includes a cylindrical electromagnetic resonator with a central through hole, a dielectric (preferably ceramic) material surrounded by symmetrically displaced through holes surrounding the central through hole. The device also includes a base and probes connected to the base. The probes are placed to introduce non-visible electromagnetic energy into the resonator. The device also includes a plasma lamp placed in the central through hole. The plasma lamp is placed to convert the non-visible electromagnetic energy into light. Preferably, the resonator is composed of a ceramic with a metalized surface except for inside the through holes. Also, a device that converts electricity into light and vice versa, a device that emits modulated light based on input modulated non-visible electromagnetic energy, and a device that emits modulated non-visible electromagnetic energy based on input modulated light, all implemented using a cylindrical electromagnetic resonator.

56 Claims, 15 Drawing Sheets

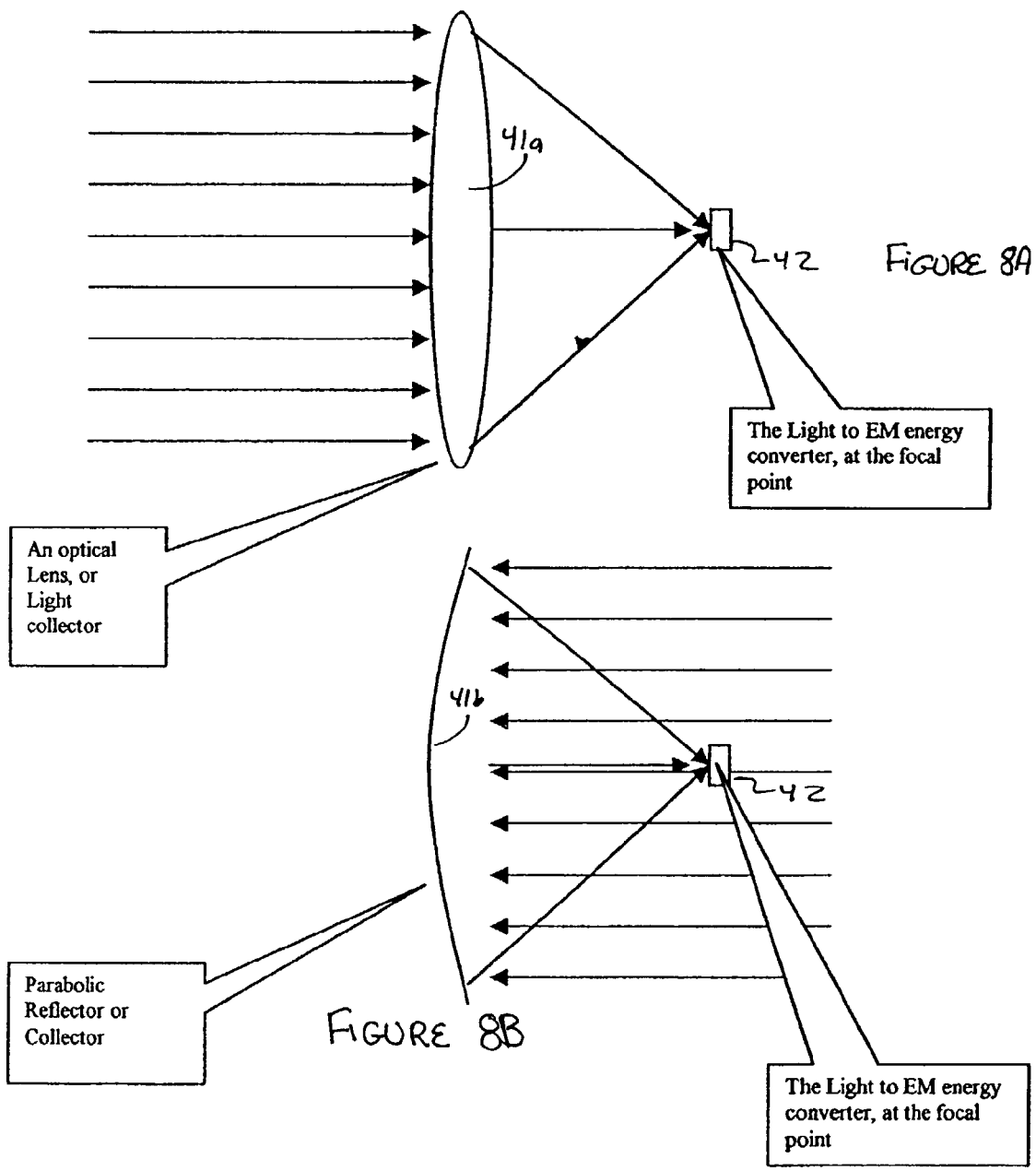

GENERATING LIGHT FROM ELECTROMAGNETIC ENERGY

CROSS REFERENCE TO PROVISIONAL APPLICATION

This application claims priority from provisional application No. 60/337,057 filed Nov. 6, 2001. This provisional application is incorporated by reference as if fully set forth herein.

BACKGROUND OF THE INVENTION

1. Field of the Invention

This invention relates to generation of light from electromagnetic energy ranging from the lower megahertz to higher millimeter wave frequencies. In particular, the invention relates to an efficient and fault-tolerant mechanism for coupling the electromagnetic energy into a plasma lamp.

2. Description of the Related Art

One known technique for converting radio-frequency (RF) and other non-visible electromagnetic energy into visible light is to direct the energy into a plasma lamp. The energy heats the plasma, which in turn generates light.

However, problems exist in focusing the energy into a bulb included in the plasma lamp. First, conventional mechanisms for focusing the energy require extreme precision to work properly. As a result, construction of these mechanisms is exacting and expensive. Second, tuning conventional mechanisms to support the most efficient frequencies is problematic. As a result, an entirely new mechanism often must be designed for each type of bulb used in the plasma lamp for each particular application.

SUMMARY OF THE INVENTION

One aspect of the invention addresses the foregoing needs with an electromagnetic resonator structure. The structure includes a symmetrical, cylindrical electromagnetic resonator including a dielectric (preferably ceramic) material surrounded by a conductor, the dielectric including five through holes arranged in an X-pattern. The structure also includes a circuit board connected with the conductor in which terminations of wire tracings on the circuit board correspond to the through holes. At least four probes are placed in the outer ones of the through holes connecting with the terminations, and a lamp is placed in the center through hole.

Another aspect of the invention is a device that converts non-visible electromagnetic energy into light. The device includes a cylindrical electromagnetic resonator with a central through hole and with symmetrically displaced through holes surrounding the central through hole. The device also includes a base and probes connected to the base. The probes are placed to introduce non-visible electromagnetic energy into the resonator. The device also includes a plasma lamp placed in the central through hole. The plasma lamp is placed to convert the non-visible electromagnetic energy into light.

Preferably, the resonator is composed of a ceramic with a metalized surface except for inside the through holes. The probes can correspond to the symmetrically displaced through holes, one probe per through hole, or the probes can correspond to a subset of the symmetrically displaced through holes. In a preferred embodiment, the resonator has four symmetrically displaced through holes surrounding the central through hole, whereby the symmetrically displaced through holes and the central through hole form an X pattern.

By virtue of the foregoing arrangements, the cylindrical resonator resonates in modes that tend to be tolerant of small variations in the actual height of the resonator. As a result, manufacturing costs for the resonator are reduced. In addition, the non-visible electromagnetic energy is concentrated on the plasma lamp, thereby facilitating efficient conversion of non-visible electromagnetic energy into light.

In a preferred embodiment, the bulb used in the plasma lamp includes a noble gas and a metal halide. For example, the plasma lamp could contain one of the following: argon and indium bromide, krypton and indium bromide, xenon and indium bromide, a noble gas and a compound of mercury, and other known combinations. Possible compositions of the plasma lamp include, but are not limited to, a quartz lamp or a ceramic lamp filled appropriate gases. A lens can be placed over the central through hole to focus light from the plasma lamp.

Preferably, the probes are adjustable within the corresponding through holes so as to allow for tuning of the probes. In one implementation, the lengths of the probes are adjustable from the tops of the through holes. Such adjustable probes could be constructed from a top part and a bottom part threaded together, with the top part including a groove or other indentation for rotary manipulation by a tool (e.g., a screwdriver). Rotation of the top part lengthens or shortens the probe. The resonator itself also can be slightly tunable, for example by insertion of dielectric rods into the through holes on top of the probes so as to tune the resonance of the resonator.

In order to help prevent leakage of non-visible electromagnetic energy from the top of the central through hole, a quarter wavelength waveguide choke can be placed at the top of the central through hole. Alternatively, a waveguide with a cut off frequency below an operational frequency of the resonator can be placed at the top of the through hole for this purpose.

The plasma in the plasma lamp can become extremely hot, possibly even hot enough to melt the lamp. An electromagnet or other magnetic field generator can be placed around the resonator so as to bunch plasma in the plasma lamp away from sides of the plasma lamp, thereby helping to prevent melting or other damage to the plasma lamp.

The probes can be connected to a power source by strip lines on the base. The strip lines preferably are impedance matched. One of the strip line circuit's ground planes can also be used to seal the central through hole at the base.

Another aspect of the invention is a device that converts electricity into light. The device includes a power source that supplies power, a generator that converts the power into non-visible electromagnetic energy, a cylindrical electromagnetic resonator, probes placed to introduce the non-visible electromagnetic energy into the resonator, and a plasma lamp placed in the resonator. Preferably, the resonator includes a central through hole and plural symmetrically displaced through holes surrounding the central through hole. The probes are placed in the outer ones of the through holes, and the plasma lamp is placed in the center through hole. A lens can be placed over the central through hole for focusing light generated by the plasma lamp.

The power source can be a direct current source. One possible arrangement for supplying power, direct current or otherwise, is to use a power divider and plural power amplifiers. The power divider divides the power into multiple branches, each branch is connected to one of the plural power amplifies so as to amplify the power in each branch, and the amplified power is connected to the probes. The arrangement combines the power in a form of non-visible electromagnetic energy in the resonator.

Another possible arrangement for supplying power, direct current or otherwise, is to use a power amplifier and a power divider. In this arrangement, the power amplifier amplifies the power, the power divider divides the amplified power, and the divided amplified power is connected to the probes. Again, the power is combined in a form of non-visible electromagnetic energy in the resonator. Other arrangements for supplying power exist.

Yet another aspect of the invention is a device that might be effective to convert light into non-visible electromagnetic energy, or vice versa. This device includes a light collector that concentrates light into intense light, a plasma lamp that converts the intense light into non-visible electromagnetic energy, and a cylindrical electromagnetic resonator with a central through hole and with symmetrically displaced through holes surrounding the central through hole. The plasma lamp is placed in the central through hole.

A further aspect of the invention is a device that emits modulated light based on input modulated non-visible electromagnetic energy. This device includes a cylindrical electromagnetic resonator with a central through hole and with symmetrically displaced through holes surrounding the central through hole, a base, and probes connected to the base. The probes are placed to introduce non-visible electromagnetic energy into the resonator. The device also includes a plasma lamp placed in the central through hole. The plasma lamp is placed to convert the non-visible electromagnetic energy into light. In this aspect of the invention, the resonator includes a piezoelectric material so that modulation of the non-visible electromagnetic energy creates a physical modulation of the resonator, which in turn modulates the light from the plasma lamp.

The foregoing aspect of the invention can be reversed. Thus, an additional aspect of the invention is a device that emits modulated non-visible electromagnetic energy based on input modulated light. This device includes a light collector that collects the modulated light, a plasma lamp that converts the modulated light into modulated non-visible electromagnetic energy, and a cylindrical electromagnetic resonator with a central through hole and with symmetrically displaced through holes surrounding the central through hole. The plasma lamp is placed in the central through hole, and the resonator includes a piezoelectric material so that modulation of the modulated non-visible electromagnetic energy is amplified.

The invention also encompasses methods corresponding to the aspects of the invention described above, as well as to a method for manufacturing the cylindrical resonator used in the invention.

This brief summary has been provided so that the nature of the invention may be understood quickly. The invention is not limited to the aspects discussed in this summary. A more complete understanding of the invention may be obtained by reference to the following description of the preferred embodiments thereof in connection with the attached drawings.

BRIEF DESCRIPTION OF THE DRAWINGS

FIGS. 8a and 8b illustrate a reversed implementation of the invention, in which light is converted into non-visible EM energy.

DESCRIPTION OF THE PREFERRED EMBODIMENT

In this description, the term "non-visible electromagnetic energy" is used for electromagnetic energy outside of the visible spectrum. The invention is envisioned to operate with non-visible electromagnetic energy in the 2 to 5 GHz range, although the invention is not limited to these frequencies. Likewise, the term "light" refers to visible light, as well as to ultraviolet and infrared light.

Figure 1B:
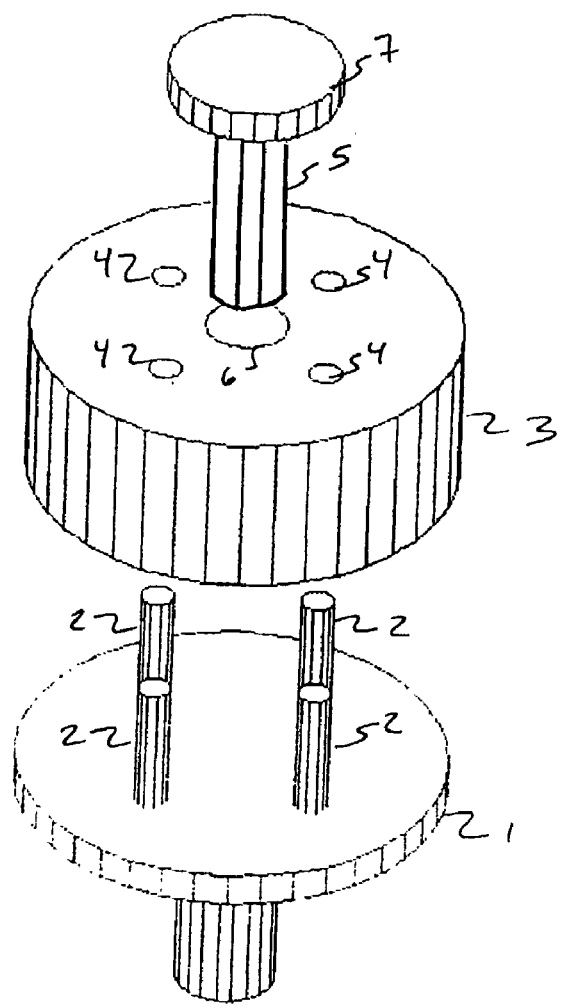
FIGS. 1a and 1b show a device according to the invention that converts non-visible electromagnetic energy into light.
Figure 1A:
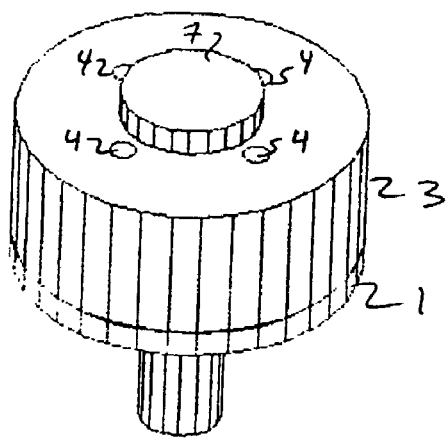

FIGS. 1a and 1b show a device according to the invention that converts non-visible electromagnetic energy into light. FIG. 11a show the device assembled, and FIG. 1b shows an exploded view of the device.

Briefly, the implementation shown in FIGS. 1a and 1b includes a cylindrical electromagnetic resonator with a central through hole and with symmetrically displaced through holes surrounding the central through hole. The device also includes a base and probes connected to the base. The probes are placed to introduce non-visible electromagnetic energy into the resonator. The device also includes a plasma lamp placed in the central through hole. The plasma lamp is placed to convert the non-visible electromagnetic energy into light.

In more detail, base 1 supports probes 2, which are electrically connected to base 1. The probes fit into cylindrical electromagnetic resonator 3, and in particular into symmetrically displaced through holes 4. "Through hole" means a hole that passes all the way through resonator 3. Plasma lamp 5 fits into central through hole 6 of resonator 3. Lens or waveguide 7 preferably covers central through hole 6 and plasma lamp 5.

Base 1 preferably is a circuit board that supplies a connection from an external source (not shown) to probes 2. The probes introduce non-visible electromagnetic energy into resonator 3.

In a preferred embodiment, resonator 3 is composed of a ceramic with a metalized surface except for inside the through holes. Other materials can be used for the resonator. In FIGS. 1a and 1b, the probes correspond to the symmetrically displaced through holes, one probe per through hole. Resonator 3 can have four symmetrically displaced through holes 4 surrounding central through hole 6, thereby forming an "X" pattern as shown. Other arrangements utilizing more or fewer and possibly differently located through holes and hole(s) for plasma lamp(s) are possible.

The non-visible electromagnetic energy from probes 2 resonates in resonator 3. The fields and energy in the resonator are discussed in more detail below with reference to FIGS. 3a, 3b, 4a and 4b. This non-visible electromagnetic energy heats the gas in plasma lamp 5, which in turn generates light. The light preferably is generated through both spontaneous and stimulated emission.

In a preferred embodiment, plasma lamp 5 includes a noble gas and a metal halide. For example, the plasma lamp could contain argon and indium bromide, krypton and indium bromide, xenon and indium bromide, a noble gas and a compound of mercury, and other known combinations. Possible compositions of plasma lamp 5 include, but are not limited to, a quartz lamp or a ceramic lamp filled appropriate gasses.

Alternatively, plasma lamp 5 could be formed by central through hole 6 itself, sealed so as to retain the gasses. In that case, the sealed central through hole can be lined or coated with a material that improves at least one of reflectivity, electrical properties, and thermal properties, for example quartz.

FIG. 1 also shows lens or waveguide 7 placed at a top of central through hole 6. A lens can be used to focus light from the plasma lamp. A quarter wavelength waveguide or a waveguide with a cut off frequency below an operational frequency of the resonator can be used in order to help prevent leakage of non-visible electromagnetic energy from the top of the central through hole. Alternatively, a solenoid or electromagnet (not shown) can also serve this purpose if placed near the top of the central through hole. Any combination of the lens, waveguide, solenoid and electromagnet can be used.

Figure 2A:
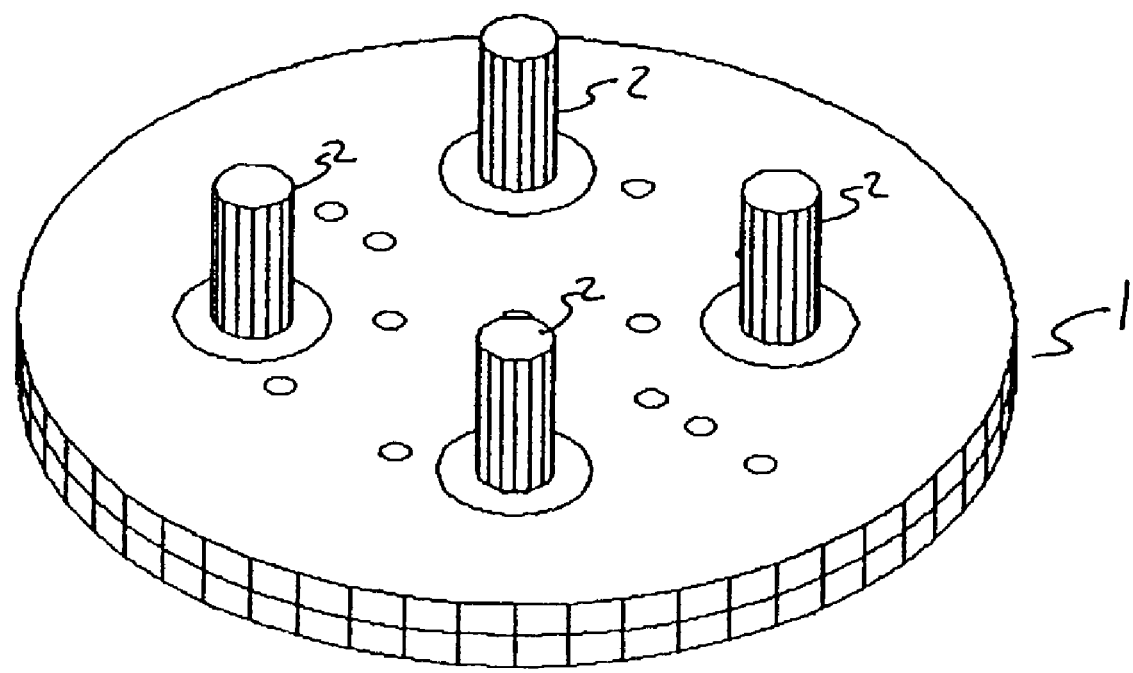
FIGS. 2a and 2b show a base connected to probes using a strip line circuit structure for use with a resonator according to the invention.
Figure 2B:
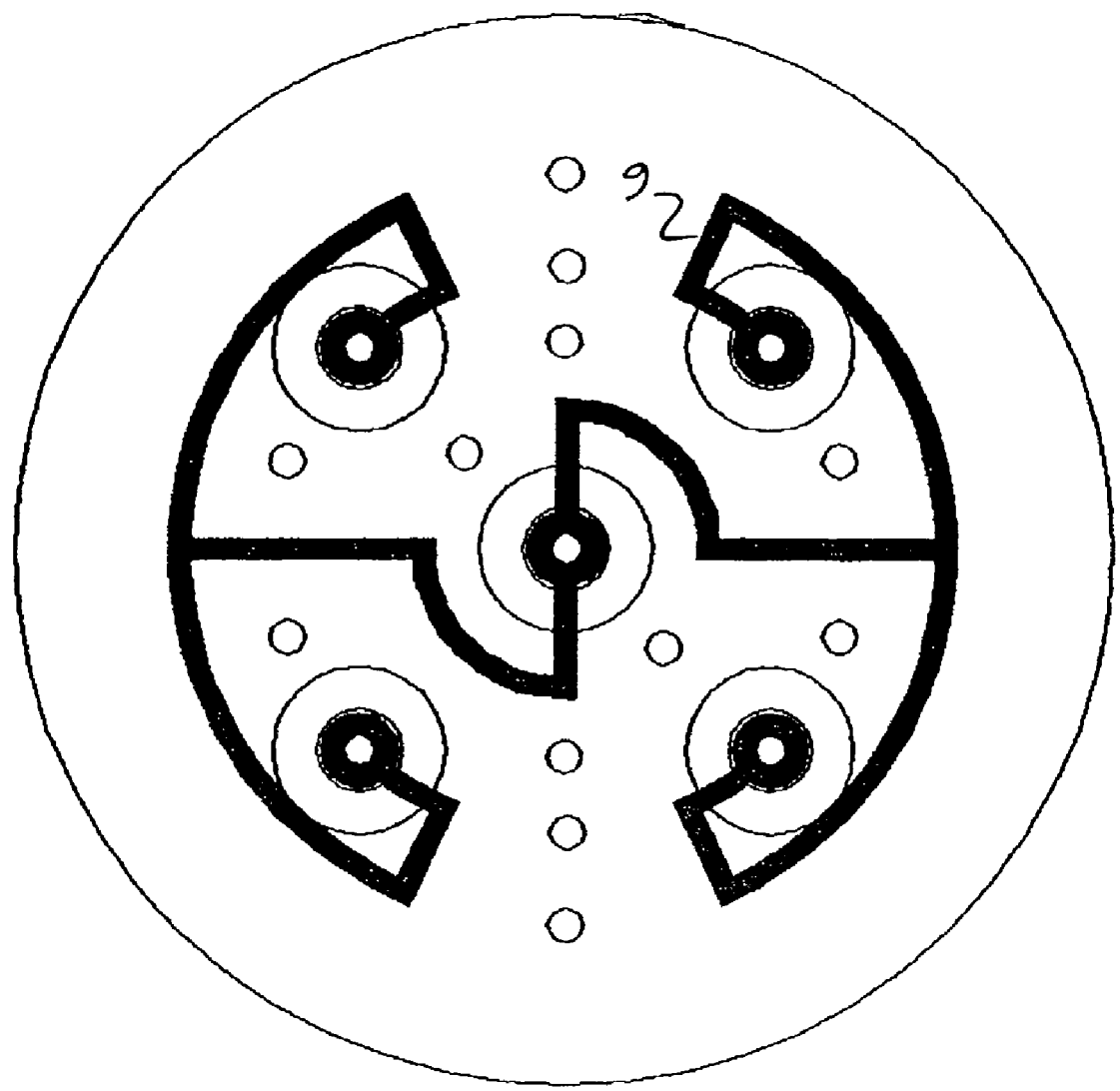

FIGS. 2a and 2b show a base connected to probes by strip lines for use with a resonator according to the invention. In FIG. 2a, four probes 2 are connected to base 1. FIG. 2b shows strip lines (also called wire tracings) 9 that can be used to feed the probes. Preferably, the strip lines are impedance matched. In addition, groundplate of the strip line can also serve to help seal central through hole 6. This feature is particularly useful when plasma lamp 5 is formed by sealing central through hole 6 and filling the hole with appropriate gasses.

Figure 3:
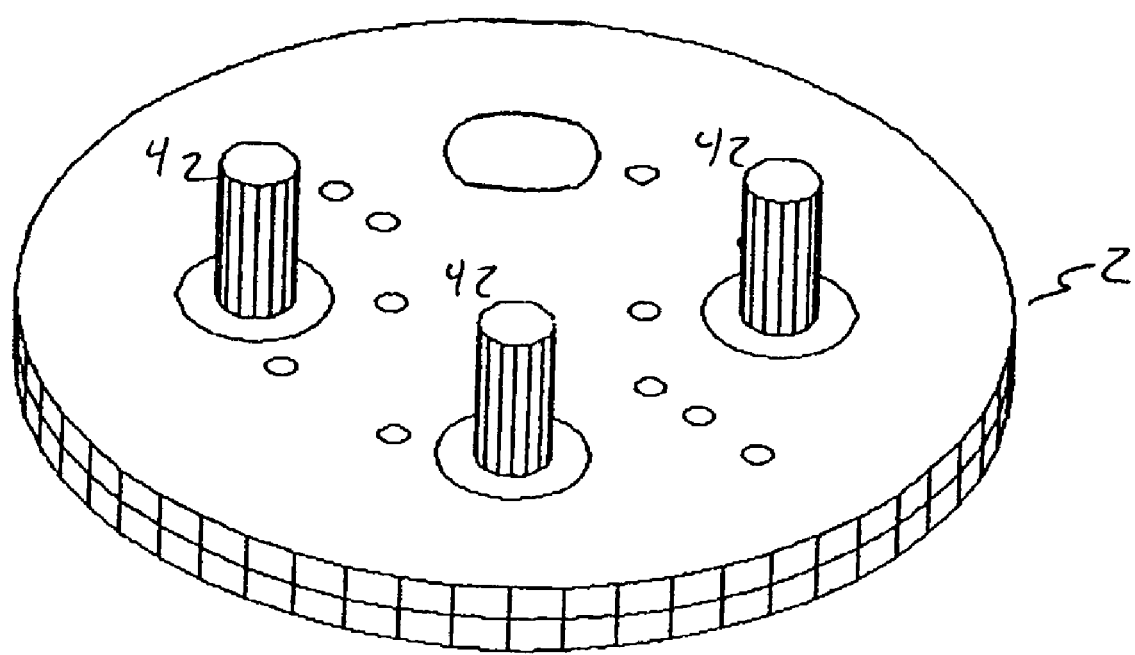
FIG. 3 illustrates use of probes corresponding to a subset of through holes in a resonator according to the invention.

FIG. 3 illustrates use of probes corresponding to a subset of through holes in a resonator according to the invention. In particular, in FIG. 3, only three probes 4 are installed. This arrangement would result in asymmetric fields in resonator 3, thus alternating its energy focusing capability. Other arrangements of differently positioned probes would result in still different fields.

Through variations in phase and number of probes, a resonator according to the invention can be designed with multiple hot spots. Plasma lamps can be placed at some or all of these hots spots, thereby allowing for generation of light from multiple lamps. In one contemplated arrangement, three hot spots are set up, with red, green and blue lamps placed at each hot spot. Of course, generation of red, green and blue light has extensive applications in imaging applications. Other arrangements are possible.

Figure 4:
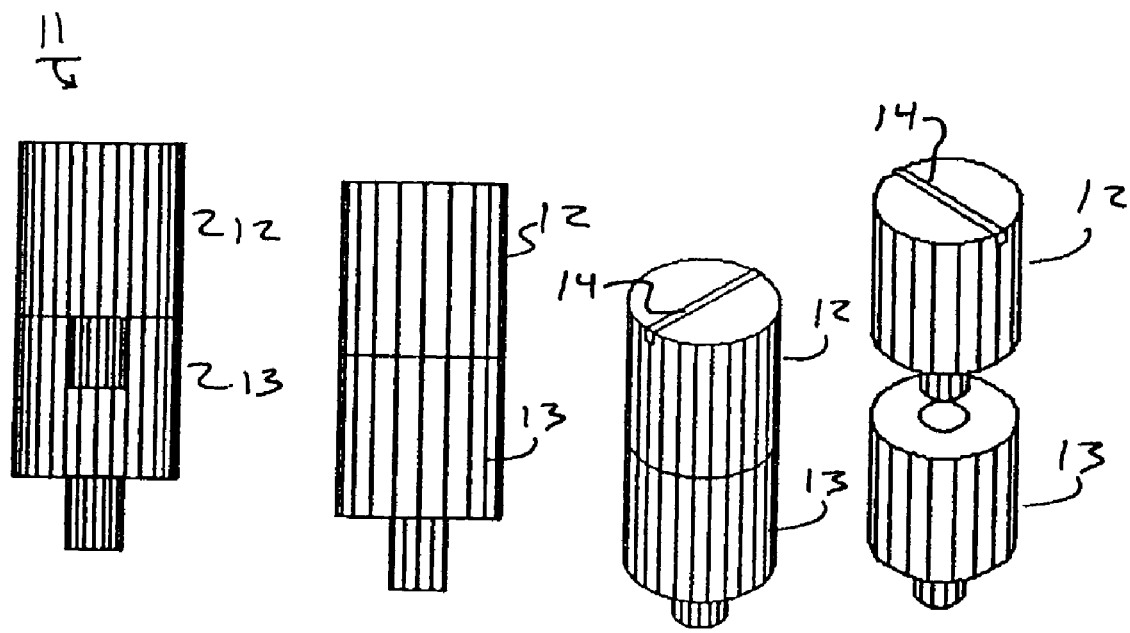
FIG. 4 shows an adjustable probe mechanism for use with a resonator according to the invention.

FIG. 4 shows an adjustable probe for use with a resonator according to the invention.

Figure 9:
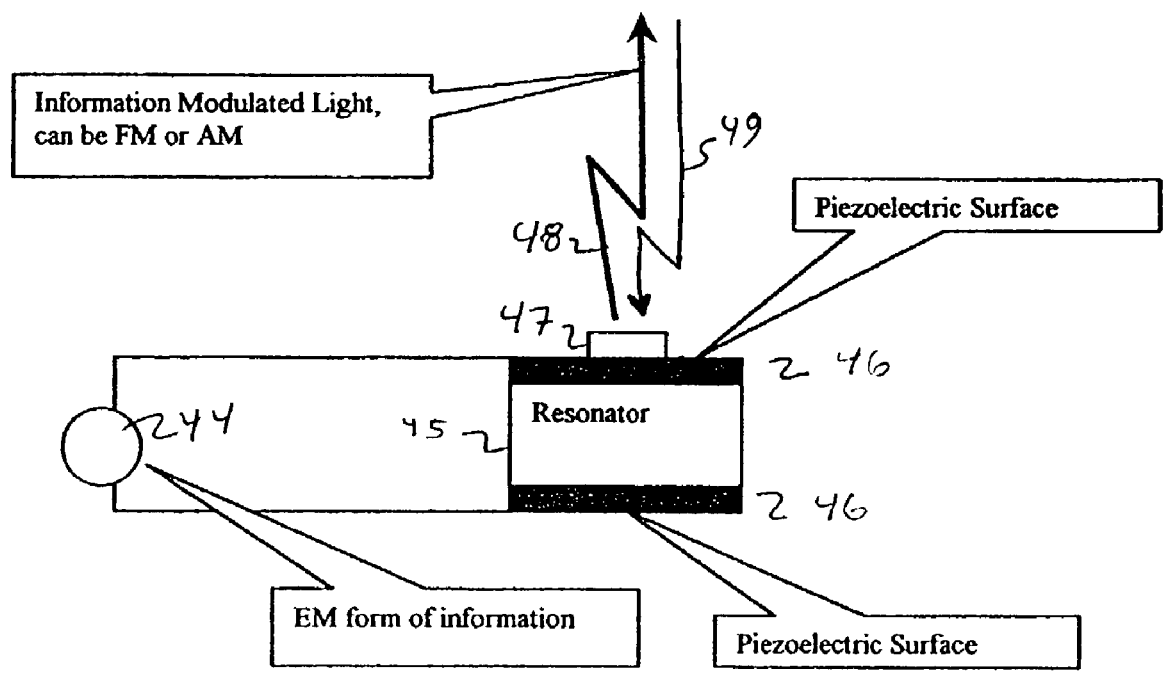
FIG. 9 illustrates application of a resonator according to the invention to modulation of light, for example for a communications system.

Preferably, the probes are adjustable within the corresponding through holes so as to allow for tuning of the probes. In one implementation, the lengths of the probes are adjustable from the tops of the through holes. Such an adjustable probe is illustrated in FIG. 9.

Probe 11 is constructed from top part 12 and bottom 13 part threaded together. Top part 12 includes a groove or other indentation 14 for rotary manipulation by a tool (e.g., a screwdriver). Rotation of the top part lengthens or shortens the probe.

Resonator 3 itself also can finely tunable, for example by insertion of dielectric rods into the through holes on top of the probes so as to tune the resonance of the resonator.

Figure 5A:
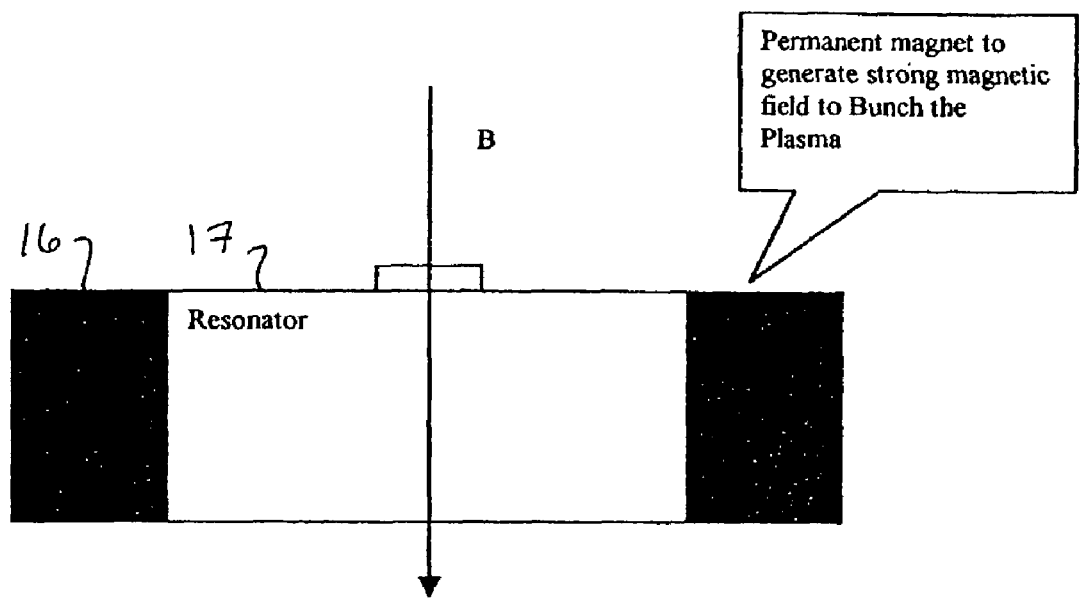
FIGS. 5a and 5b show use of a permanent magnet and an electromagnet to bunch plasma away from boundaries of a plasma lamp in a resonator according to the invention.
Figure 5B:
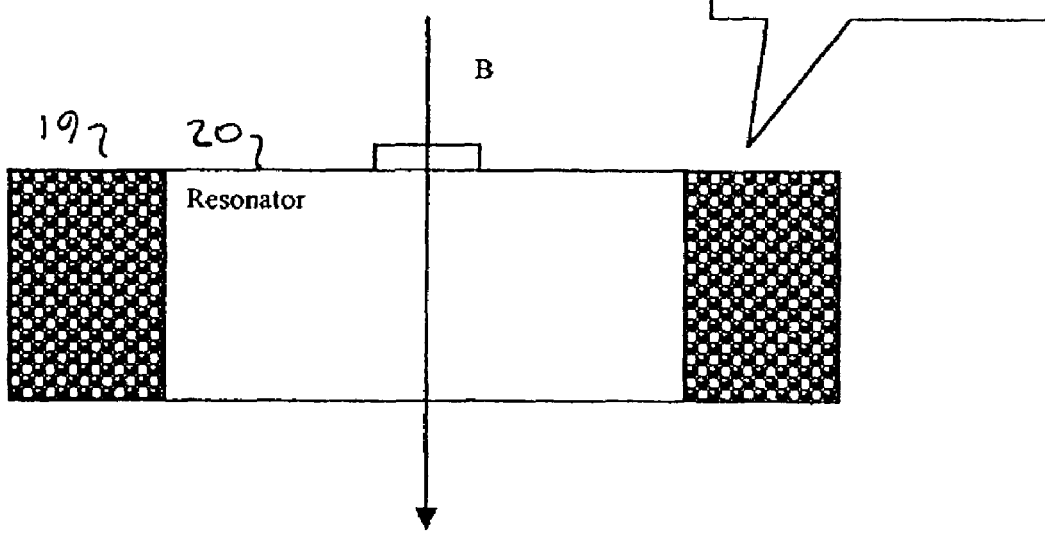

FIGS. 5a and 5b show use of a permanent magnet and an electromagnet to bunch plasma away from boundaries of a plasma lamp in a resonator according to the invention.

Plasma in a plasma lamp can become extremely hot, possibly even hot enough to melt the lamp. A solenoid or electromagnet can be placed around the resonator to provide a biased magnetic field and bunch plasma in the plasma lamp away from sides of the plasma lamp, thereby helping to prevent melting of the plasma lamp. Thus, FIG. 5a shows a cross section of solenoid (i.e., permanent magnet) 16 placed around resonator 17. Likewise, FIG. 5b shows a cross section of electromagnet 19 placed around resonator 20. Both of these arrangements help protect the sides of a plasma lamp placed in the resonators.

Figure 6A:
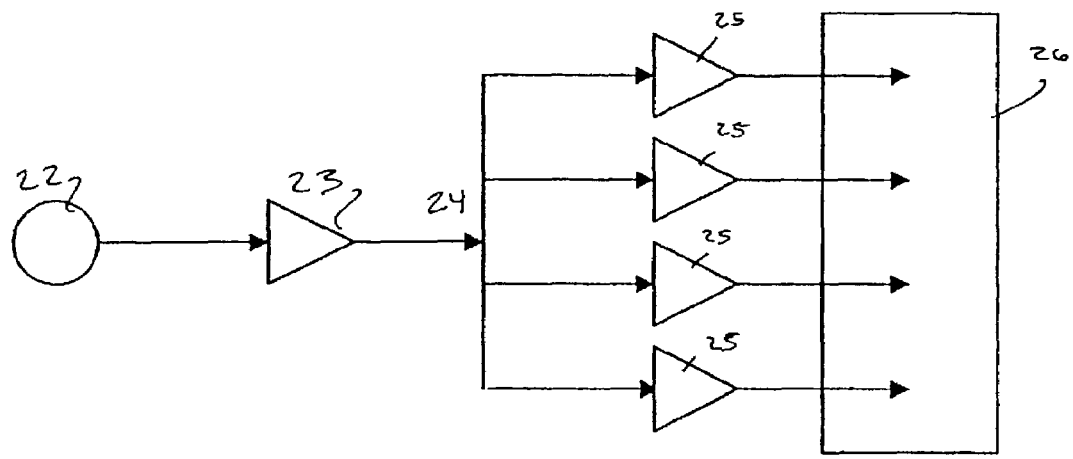
FIGS. 6a and 6b show techniques for incorporating a DC-to-EM (direct current to electromagnetic) feature into a resonator according to the invention.
Figure 6B:
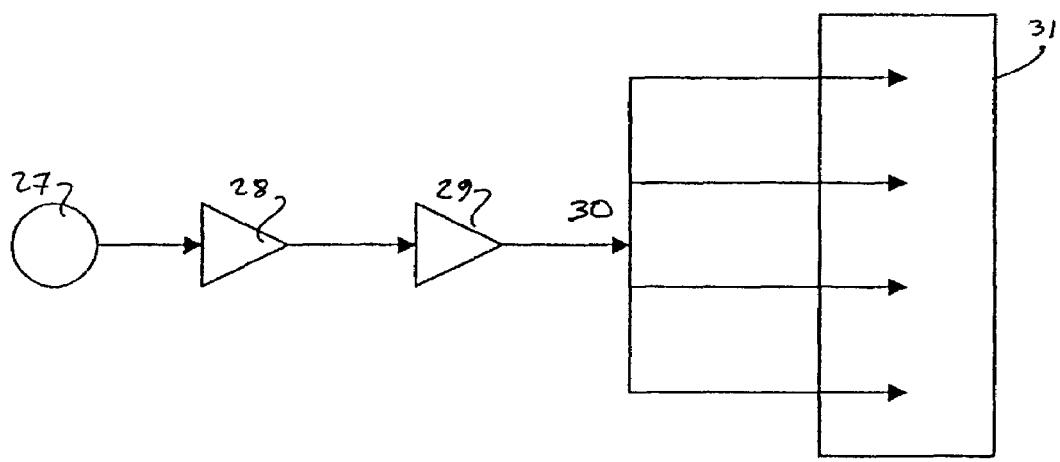

FIGS. 6a and 6b show techniques for incorporating a DC-to-EM (direct current to electromagnetic) feature into a resonator according to the invention.

A DC-to-EM feature can be used in an implementation of the invention that converts electricity into light. This aspect of the invention simply drives the probes with an electric power source. The power source can be a direct current source.

One possible arrangement for supplying power, direct current or otherwise, is to use a power divider and plural power amplifiers as shown in FIG. 6a. In more detail, power from source 22 is pre-amplified by pre-amplifier 23 and then divided by power divider 24. The divided power in each branch is amplified by its own power amplifier 25. Then, the power is used to excite probes in resonator 26. Preferably, the power is divided into as many branches as the resonator has probes. The arrangement combines the power in a form of non-visible electromagnetic energy in the resonator.

Another possible arrangement for supplying power, direct current or otherwise, is to use a power amplifier and a power divider as shown in FIG. 6b. In this arrangement, power from source 27 is pre-amplified by pre-amplifier 28 and then further amplified by power amplifier 29. The amplified power is then divided by power divider 30. The divided amplified power is connected to probes in resonator 31. Preferably, the power is divided into as many branches as the resonator has probes. Again, the power is combined in a form of non-visible electromagnetic energy in the resonator. Other arrangements for supplying power exist.

FIGS. 7a to 7e illustrate a compact implementation of the resonator, EM sources, and possibly heat sink according to the invention.

Figure 7A:
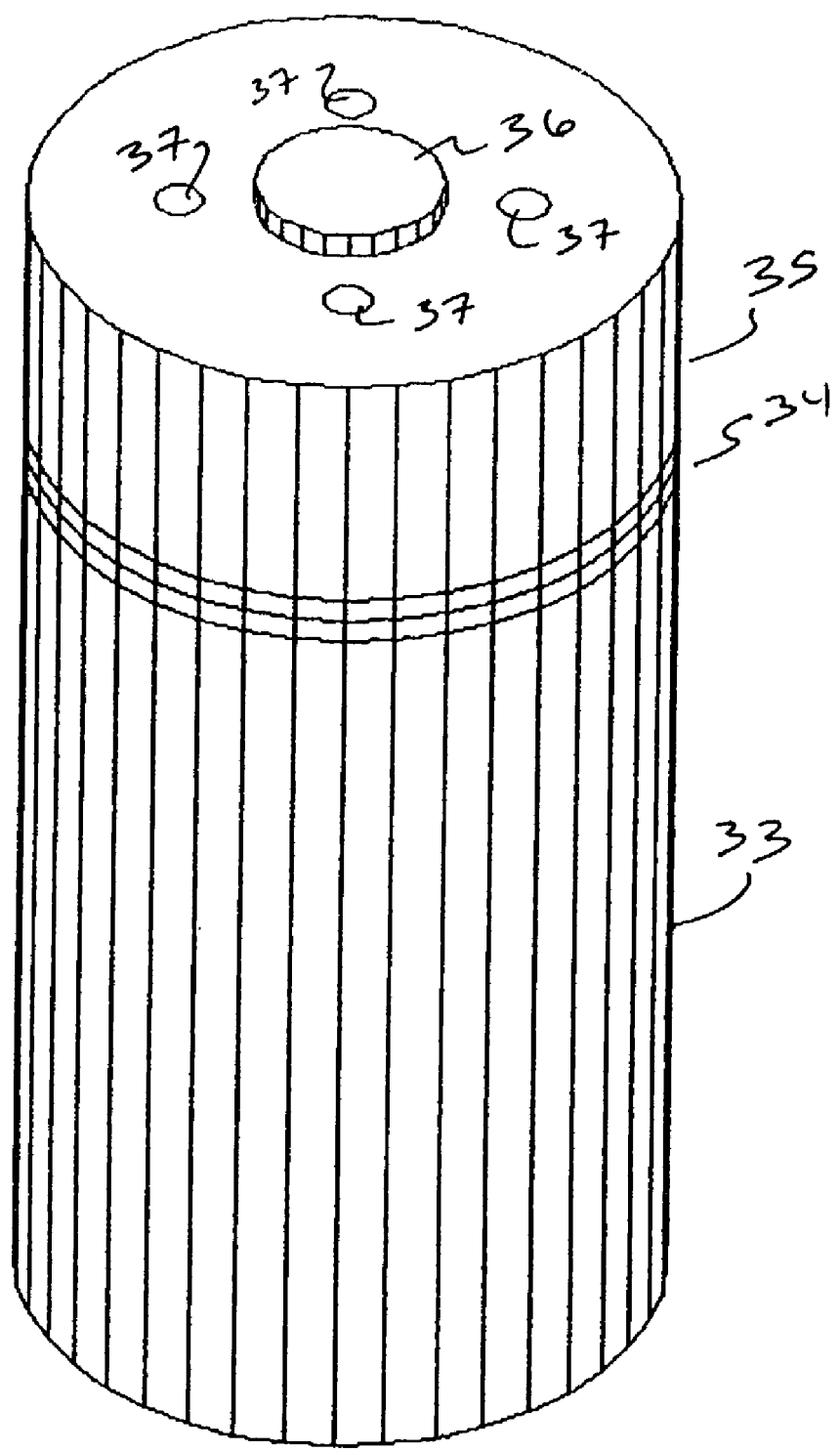
FIGS. 7a to 7e illustrate a compact implementation of the resonator, EM sources, amplifiers, and possibly heat sink according to the invention.
Figure 7B:
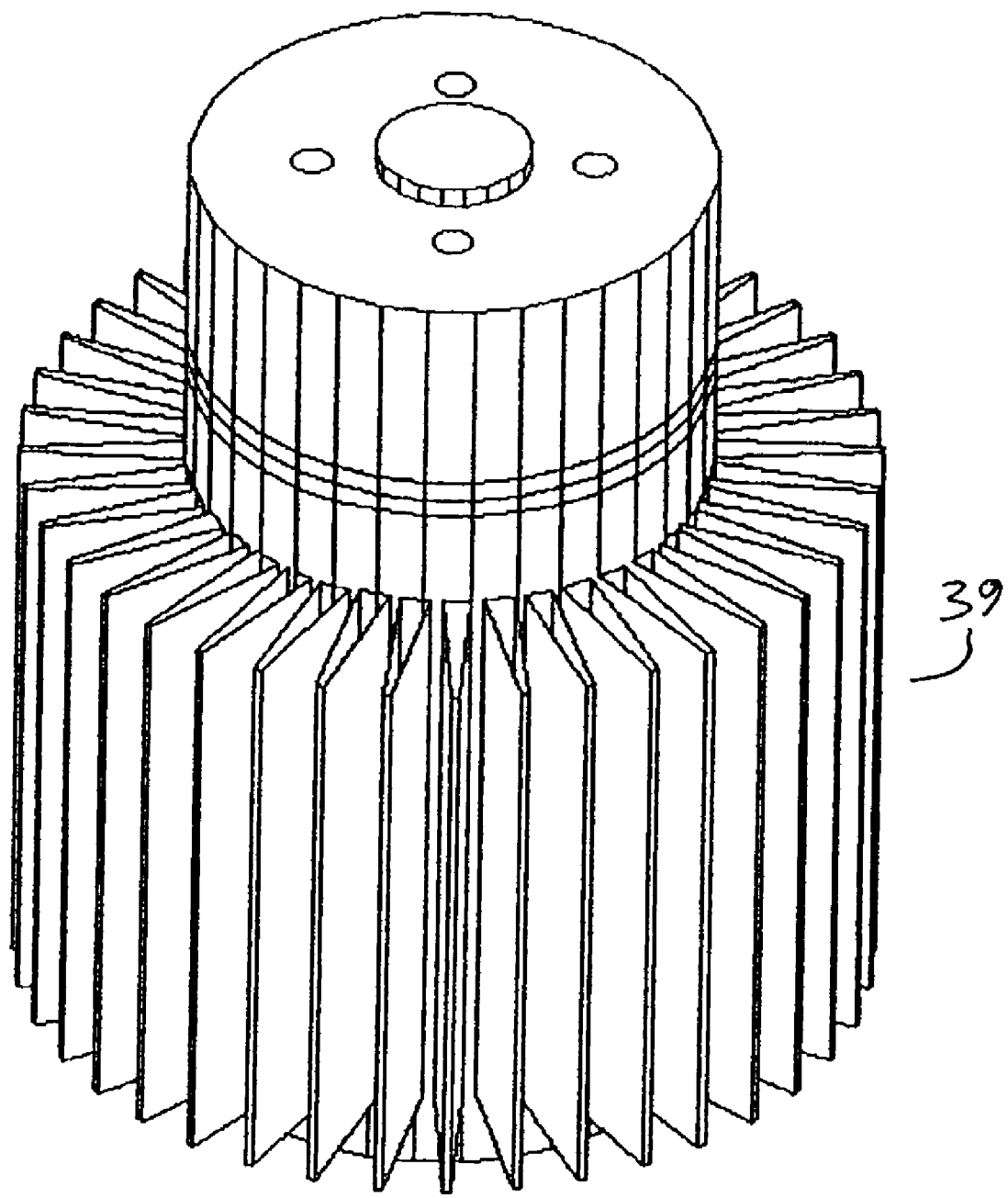
Figure 7C:
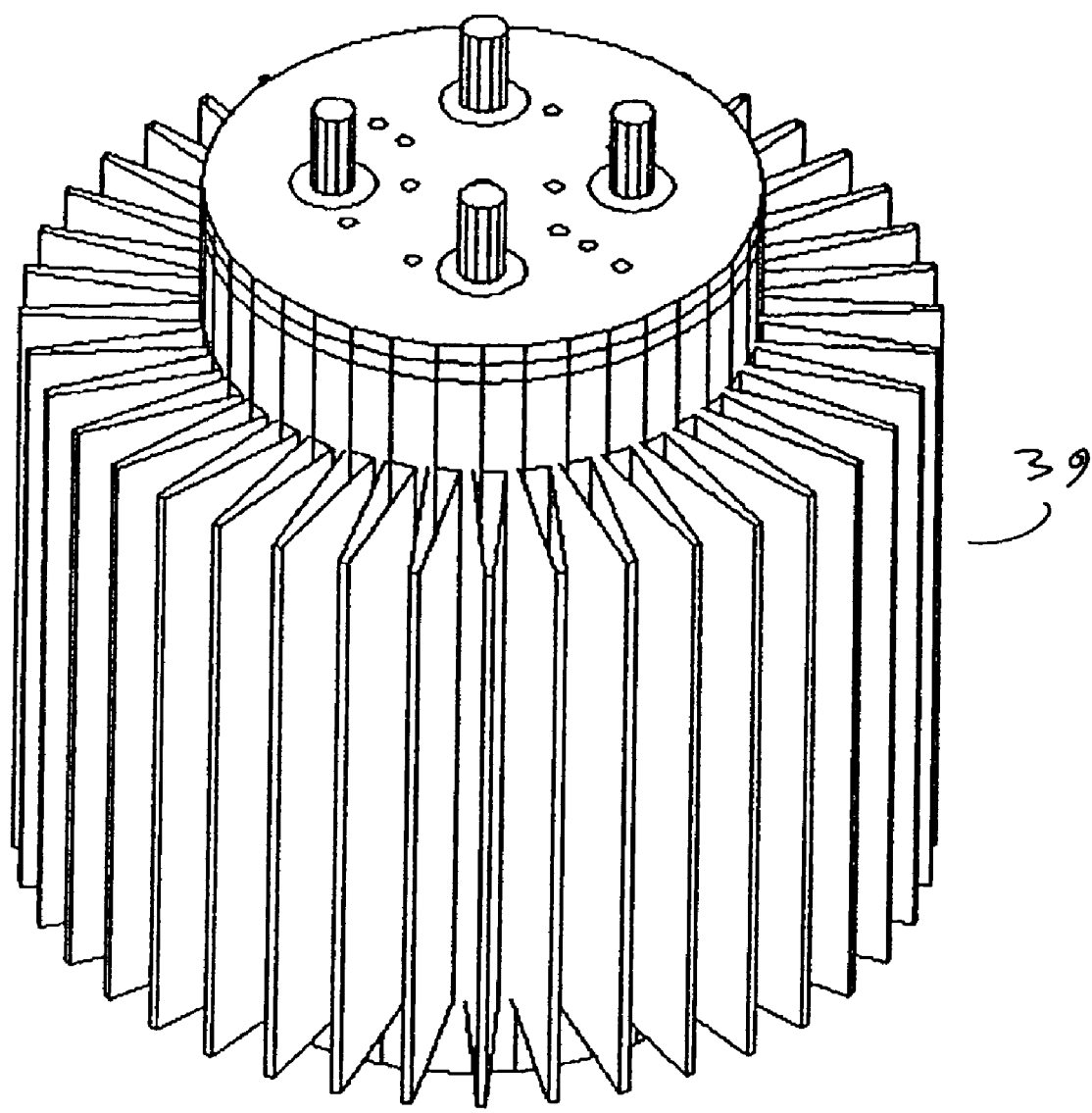
Figure 7D:
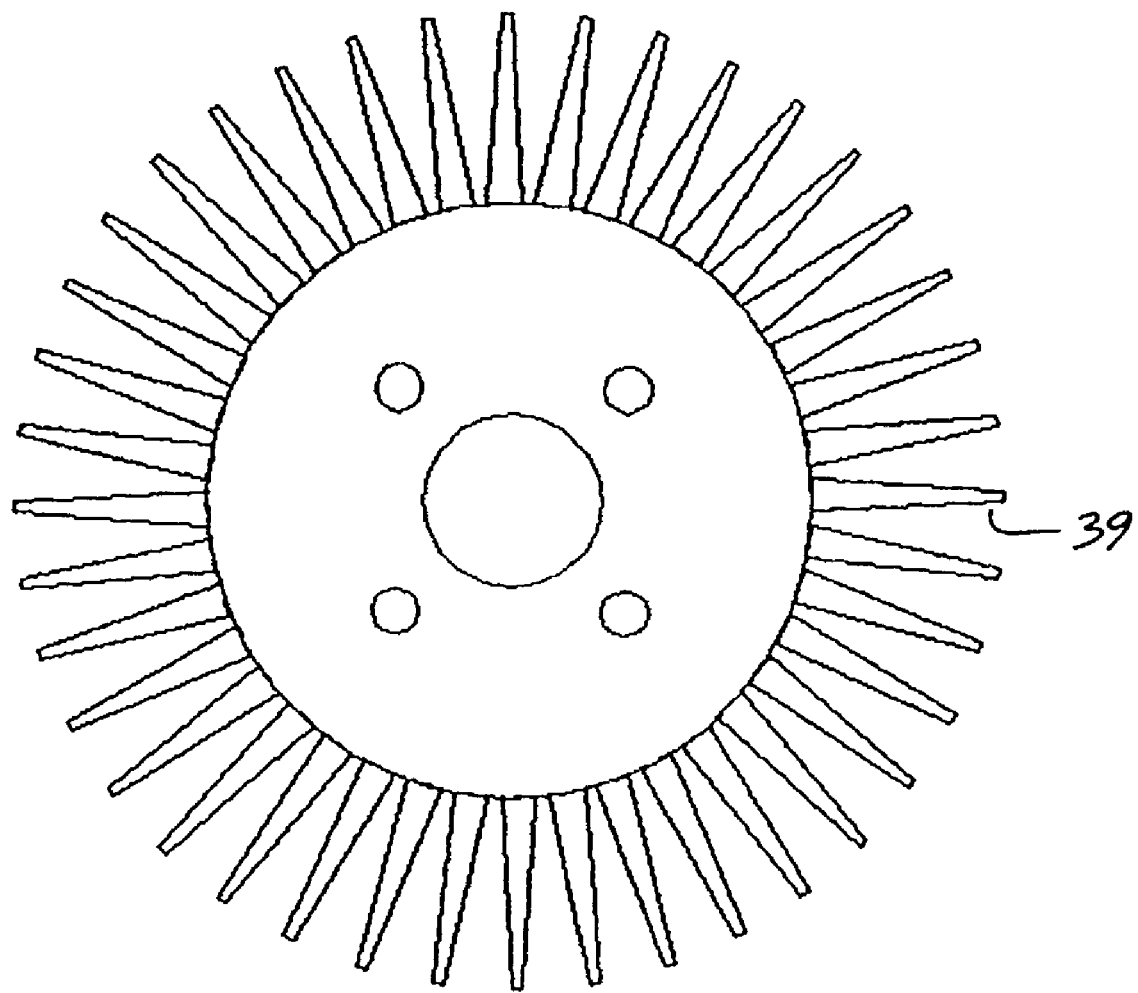
Figure 7E:
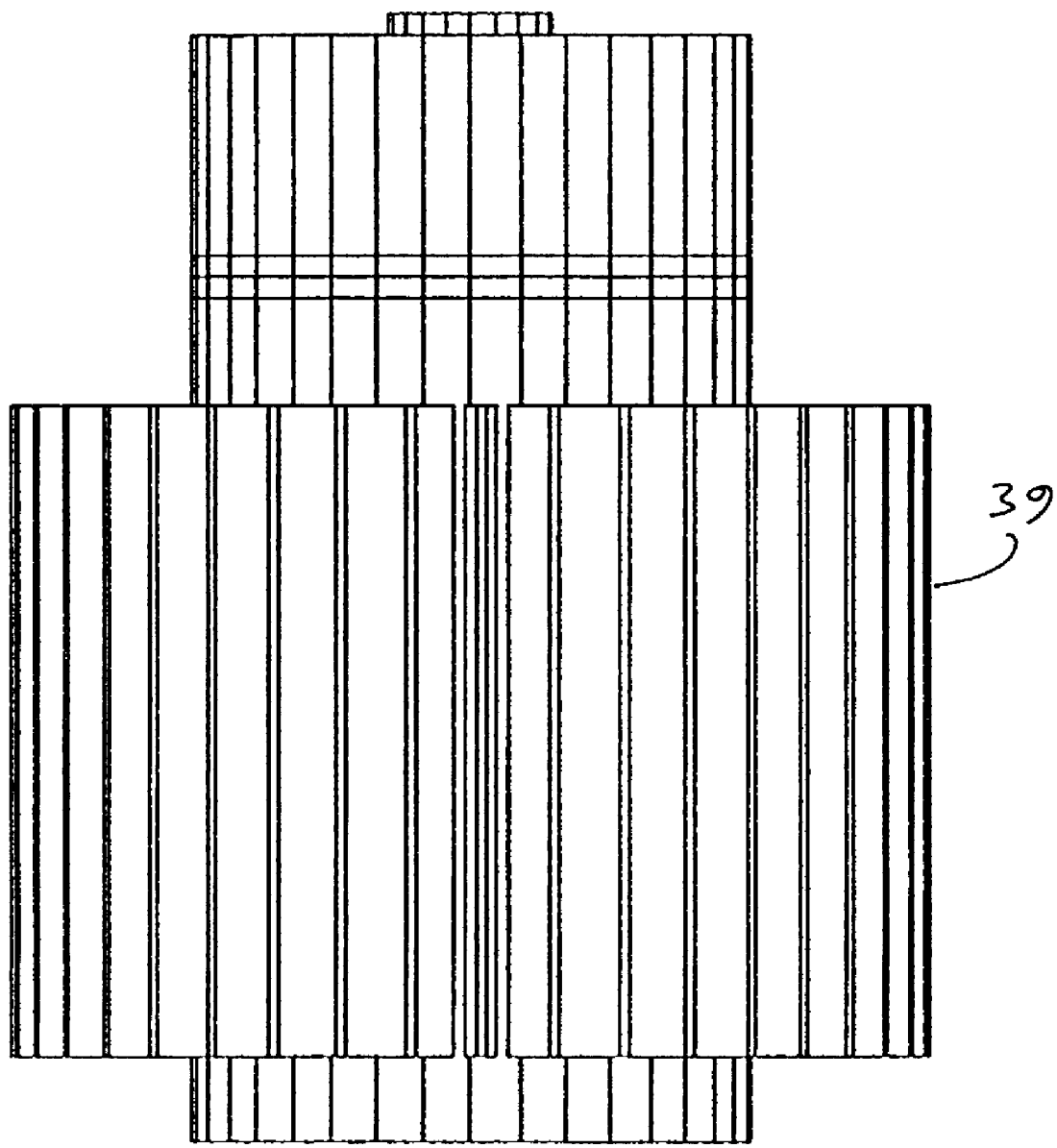

In FIG. 7a, power source/s/dividers 33 supply power to probes (not shown) connected to base 34. The probes extend into resonator 35, where a plasma lamp (not shown) generates light. The light is emitted from lens/waveguide 36. As shown in FIG. 7a, through holes 37 for the probes are accessible, for example for tuning the probes or for insertion of dielectrics to help tune resonator 35. FIGS. 7b to 7e show various views of the arrangement shown in FIG. 7a, with the addition of heat sinks 39. Although the preferred embodiment includes a single power oscillator without amplifiers, alternative embodiments (as shown herein) can include amplifiers.

FIGS. 8a and 8b illustrate a reversed implementation of the invention, in which light is converted into non-visible EM energy.

The invention might be effective in both directions. Thus, the invention can be implemented to convert light into non-visible electromagnetic energy. Light is collected, for example by a optical lens 41a or an optical reflector 41b as shown in FIGS. 8a and 8b, respectively. The resulting intense light is focused on cylindrical electromagnetic resonator 42 according to the invention, where it is converted by a plasma lamp (not shown) into non-visible electromagnetic energy which resonates in the resonator.

FIG. 9 illustrates application of a resonator according to the invention to modulation of light, for example for a communications system.

In FIG. 9, electromagnetic information source 44 is connected to probes in resonator 45. This resonator is constructed along the lines of those discussed above, except for the inclusion of piezoelectric material 46. Thus, resonator 45 includes plasma lamp 47 for generating light 48 from non-visible electromagnetic energy from source 44. The piezoelectric material is selected to expand and to contract at certain frequencies corresponding to information values (e.g., digital values 1 or 0 or analog values) in the non-visible electromagnetic energy. As a result, modulation of the energy creates a physical modulation of the piezoelectric material, which in turn modulates light 48 from plasma lamp 47 by altering the resonance of resonator 45.

The foregoing aspect of the invention is reversible. Thus, instead of using the apparatus in FIG. 9 to modulate light based on input electromagnetic information, modulated light 49 can be input into the apparatus. When this light excites plasma lamp 47, non-visible electromagnetic energy resonates in resonator 45. This energy causes physical modulation of piezoelectric material 46, which in turn amplifies modulation of the non-visible electromagnetic energy in resonator 45.

Figure 10:
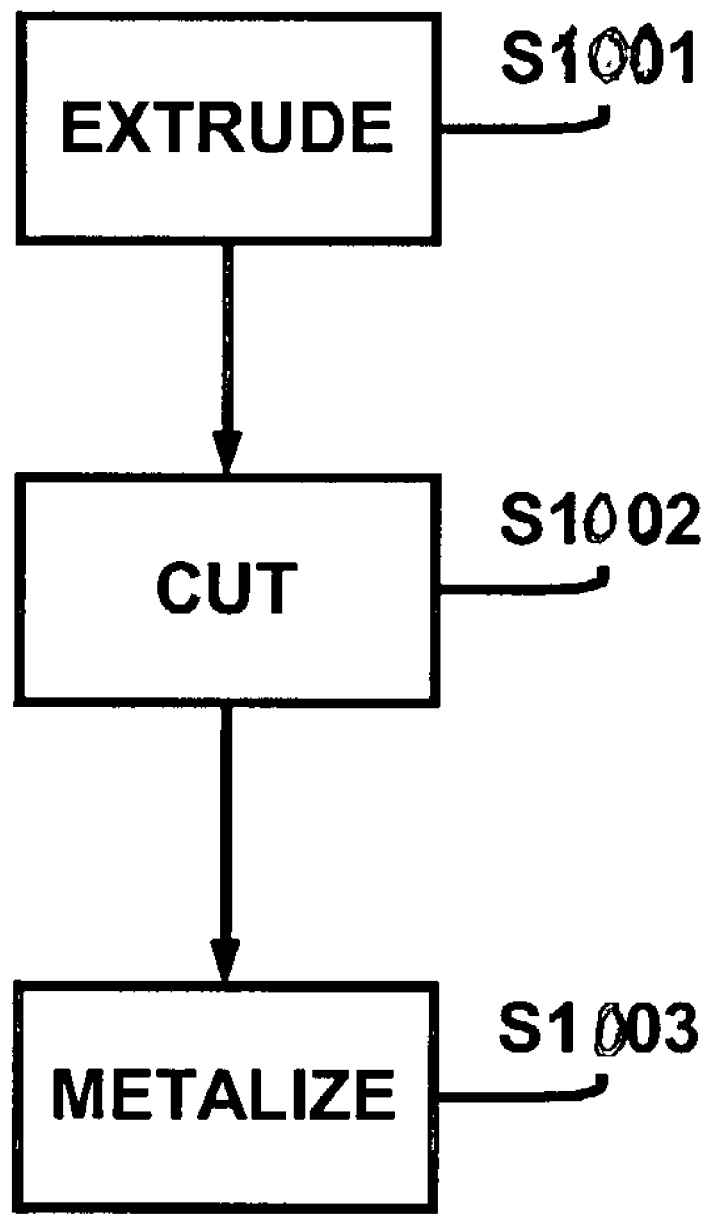
FIG. 10 illustrates a method for making a resonator according to the invention.

FIG. 10 illustrates a method for making a resonator according to the invention. As discussed above, the resonator itself is somewhat tolerant to height variations when operated a $TM_{010}$ mode family. Therefore, a less accurate and less expensive manufacturing process can be used to make the resonator. Furthermore, the holes in the resonator for the plasma lamp and probes are all through holes. As a result, the resonator can simply be cut from an extruded piece of material with the desired size and desired number and size(s) of through holes.

In more detail, in step S1001 of FIG. 10, a cylindrical ceramic bar with a central through hole and with symmetrically displaced through holes surrounding the central through hole is extruded. Then, the bar is cut in step S1002 into lengths equal to the heights of the resonators that are being made. Next, in step S1003, the cut lengths are metalized except for inside the through holes. Additional steps, such as lining or coating the central through hole for use as a plasma lamp, can then follow.

ALTERNATIVE EMBODIMENTS

Although preferred embodiments of the invention are disclosed herein, many variations are possible which remain within the content, scope and spirit of the invention, and these variations would become clear to those skilled in the art after perusal of this application.

What is claims is:

1. A device that converts non-visible electromagnetic energy into light, comprising:
    a cylindrical electromagnetic resonator with a central through hole and with symmetrically displaced through holes surrounding the central through hole;
    a base;
    probes connected to the base, the probes placed to introduce non-visible electromagnetic energy into the resonator; and
    a plasma lamp placed in the central through hole, the plasma lamp placed to convert the non-visible electromagnetic energy into light.

2. A device as in claim 1, wherein the resonator is composed of a ceramic with a metalized surface except for inside the through holes.

3. A device as in claim 1, wherein the probes correspond to the symmetrically displaced through holes, one probe per through hole.

4. A device as in claim 1, wherein the probes correspond to a subset of the symmetrically displaced through holes.

5. A device as in claim 1, wherein the resonator has four symmetrically displaced through holes surrounding the central through hole, whereby the symmetrically displaced through holes and the central through hole form an X pattern.

6. A device as in claim 5, wherein the probes correspond to the symmetrically displaced through holes, one probe per through hole.

7. A device as in claim 1, wherein the plasma lamp includes a noble gas and a metal halide.

8. A device as in claim 7, wherein the noble gas is krypton, argon, xenon or another noble gas and the metal halide is indium bromide, indium iodide, or a mercury compound.

9. A device as in claim 1, wherein the plasma lamp is a quartz lamp filled with a noble gas and a metal halide.

10. A device as in claim 1, wherein the plasma lamp is a ceramic lamp filled with a noble gas and a metal halide.

11. A device as in claim 1, wherein the plasma lamp comprises the central through hole, sealed so as to retain gases and filled with a noble gas and a metal halide.

12. A device as in claim 11, wherein the sealed central through hole is lined or coated with a material that improves at least one of reflectivity, electrical properties, and thermal properties.

13. A device as in claim 12, wherein the central through hole is lined with quartz.

14. A device as in claim 1, further comprising a filler placed in the central through hole with the lamp.

15. A device as in claim 1, further comprising a lens placed over the central through hole opposite the base.

16. A device as in claim 1, wherein the lengths of the probes are adjustable within the corresponding through holes so as to allow for tuning of the probes.

17. A device as in claim 1, wherein the lengths of the probes are adjustable from the tops of the through holes.

18. A device as in claim 17, wherein the probes each comprise a top part and a bottom part, the top part and the bottom part threaded together, and the top part including a groove or other indentation for rotary manipulation by a tool, whereby rotation of the top part lengthens or shortens the probe.

19. A device as in claim 18, wherein the groove is a groove for a screwdriver.

20. A device as in claim 1, further comprising dielectric rods inserted into the through holes on top of the probes so as to tune the resonance of the resonator.

21. A device as in claim 1, further comprising a quarter wavelength waveguide placed at an end of the central through hole opposite the base so as to decrease leakage of non-visible electromagnetic energy from the central through hole.

22. A device as in claim 1, further comprising a waveguide placed at an end of the central through hole opposite the base, the waveguide with a cut off frequency below an operational frequency of the resonator so as to decrease leakage of non-visible electromagnetic energy from the central through hole.

23. A device as in claim 1, further comprising a solenoid placed near an end of the central through hole opposite the base so as to decrease leakage of non-visible electromagnetic energy from the central through hole.

24. A device as in claim 1, further comprising an electromagnet placed near an end of the central through hole opposite the base so as to decrease leakage of non-visible electromagnetic energy from the central through hole.

25. A device as in claim 1, further comprising a solenoid placed around the resonator so as to bunch plasma in the plasma lamp away from sides of the plasma lamp, thereby helping to prevent melting of the plasma lamp.

26. A device as in claim 1, further comprising an electromagnet placed around the resonator so as to bunch plasma in the plasma lamp away from sides of the plasma lamp, thereby helping to prevent melting of the plasma lamp.

27. A device as in claim 1, wherein the plasma lamp converts the non-visible electromagnetic energy into light through both spontaneous and stimulated emission of light 28. A device as in claim 1, wherein the probes are connected to the base by a strip line circuit.

29. A device as in claim 28, wherein a ground plane of the strip line circuit seals the central through hole at the base.

30. A device as in claim 28, wherein the strip line circuit leading to the probes are impedance matched.

31. A method of converting non-visible electromagnetic energy into light, comprising the steps of:
   introducing non-visible electromagnetic energy into a cylindrical electromagnetic resonator, the resonator having a central through hole and symmetrically displaced through holes surrounding the central through hole, the non-visible electromagnetic energy introduced using probes connected to a base; and
   converting the non-visible electromagnetic energy into light using a plasma lamp placed in the central through hole.

32. A method as in claim 31, wherein the resonator is composed of a ceramic with a metalized surface except for inside the through holes.

33. A method as in claim 31, wherein the probes correspond to the symmetrically displaced through holes, one probe per through hole.

34. A method as in claim 31, wherein the probes correspond to a subset of the symmetrically displaced through holes.

35. A method as in claim 31, wherein the resonator has four symmetrically displaced through holes surrounding the central through hole, whereby the symmetrically displaced through holes and the central through hole from an X pattern.

36. A method as in claim 35, wherein the probes correspond to the symmetrically displaced through holes, one probe per through hole.

37. A method as in claim 31, wherein the plasma lamp includes a noble gas and a metal halide.

38. A method as in claim 37, wherein the noble gas is krypton, argon, xenon or another noble gas and the metal halide is indium bromide, indium iodide, or a mercury compound.

39. A method as in claim 31, wherein the plasma lamp is a quartz lamp filled with a noble gas and a metal halide.

40. A method as in claim 31, wherein the plasma lamp is a ceramic lamp filled with a noble gas and a metal halide.

41. A method as in claim 31, wherein the plasma lamp comprises the central through hole, sealed so as to retain gases and filled with a noble gas and a metal halide.

42. A method as in claim 41, wherein the sealed central through hole is lined or coated with a material that improves at least one of reflectivity, electrical properties, and thermal properties.

43. A method as in claim 42, wherein the central through hole is lined with quartz.

44. A method as in claim 31, further comprising the step of focusing the light with a lens placed over the central through hole opposite the base.

45. A method as in claim 31, further comprising the step of tuning the probes by adjusting lengths of the probes within the corresponding through holes.

46. A method as in claim 31, wherein the lengths of the probes are adjustable from the tops of the through holes.

47. A method as in claim 46, wherein the probes each comprise a top part and a bottom part, the top part and the bottom part threaded together, and the top part including a groove or other indentation for rotary manipulation by a tool, whereby rotation of the top part lengthens or shortens the probe.

48. A method as in claim 47, wherein the groove is a groove for a screwdriver.

49. A method as in claim 31, further comprising the step of tuning resonance of the resonator with dielectric rods inserted into the through holes on top of the probes.

50. A method as in claim 31, further comprising the step of decreasing leakage of non-visible electromagnetic energy from the central through hole by placing a quarter wavelength waveguide at an end of the central through hole opposite the base.

51. A method as in claim 31, further comprising the step of decreasing leakage of non-visible electromagnetic energy from the central through hole by placing a waveguide at an end of the central through hole opposite the base, the waveguide with a cut off frequency below an operational frequency of the resonator.

52. A method as in claim 31, further comprising the step of bunching plasma in the plasma lamp away from sides of the plasma lamp by placing an electromagnet around the resonator, thereby helping to prevent melting of the plasma lamp.

53. A method as in claim 31, wherein the plasma lamp converts the non-visible electromagnetic energy into visible light through both spontaneous and stimulated emission of light.

54. A method as in claim 31, wherein the probes are connected to the base by strip lines.

55. A method as in claim 54, wherein the strip line circuit also seals the central through hole at the base.

56. A method as in claim 55, wherein the strip line circuit leading to the probes are impedance matched.

* * * * *